United States Patent
Park et al.

(10) Patent No.: US 8,290,495 B2
(45) Date of Patent: Oct. 16, 2012

(54) APPARATUS AND METHOD FOR VELOCITY ESTIMATION IN MOBILE COMMUNICATION SYSTEM

(75) Inventors: Goo-Hyun Park, Yongin-si (KR); Sung-Kwon Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 169 days.

(21) Appl. No.: 12/660,463

(22) Filed: Feb. 26, 2010

(65) Prior Publication Data

US 2010/0216406 A1 Aug. 26, 2010

(30) Foreign Application Priority Data

Feb. 26, 2009 (KR) .................. 10-2009-0016164

(51) Int. Cl.
*H04W 36/00* (2009.01)

(52) U.S. Cl. ............... 455/441; 455/67.11; 455/67.16; 455/226.1; 455/455; 455/504; 455/509; 370/335; 370/342; 342/461; 342/59; 342/104; 342/106

(58) Field of Classification Search .......... 455/441, 455/67.11, 67.16, 226.1, 561, 504, 509, 455; 370/335, 342; 342/461, 104, 106, 59, 107
See application file for complete search history.

(56) References Cited

U.S. PATENT DOCUMENTS

| | | | | |
|---|---|---|---|---|
| 6,385,460 | B1 * | 5/2002 | Wan | 455/515 |
| 6,526,286 | B2 * | 2/2003 | Wan | 455/515 |
| 6,542,745 | B1 * | 4/2003 | Mottier et al. | 455/441 |
| 6,862,457 | B1 * | 3/2005 | Sarkar et al. | 455/522 |
| 6,987,971 | B2 * | 1/2006 | Kirsch | 455/441 |
| 7,076,379 | B2 * | 7/2006 | Lee et al. | 702/75 |
| 7,079,814 | B2 * | 7/2006 | Frantti et al. | 455/67.11 |
| 7,299,010 | B2 * | 11/2007 | Lee et al. | 455/62 |
| 7,302,267 | B2 * | 11/2007 | Lee et al. | 455/441 |
| 7,369,876 | B2 * | 5/2008 | Lee et al. | 455/561 |
| 7,529,319 | B2 * | 5/2009 | Hsiung et al. | 375/319 |
| 7,539,166 | B2 * | 5/2009 | Do et al. | 370/335 |
| 7,541,976 | B2 * | 6/2009 | Zhang et al. | 342/461 |
| 7,647,049 | B2 * | 1/2010 | Engdahl et al. | 455/441 |
| 7,881,739 | B2 * | 2/2011 | Sarkar et al. | 455/522 |
| 2005/0282499 | A1 * | 12/2005 | Park et al. | 455/67.11 |
| 2008/0130512 | A1 * | 6/2008 | Park et al. | 370/252 |

* cited by examiner

*Primary Examiner* — Marceau Milord (57) ABSTRACT

A base station is capable of performing a method for velocity estimation in a mobile communication system. In the velocity estimation method, a received signal is delayed by a plurality of different sample intervals. A candidate maximum Doppler frequency for each of the delayed received signals is estimated. A maximum Doppler frequency in a reliable period is selected among the candidate maximum Doppler frequencies.

24 Claims, 13 Drawing Sheets

APPARATUS AND METHOD FOR VELOCITY ESTIMATION IN MOBILE COMMUNICATION SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Feb. 26, 2009 and assigned Serial No. 10-2009-0016164, the contents of which are herein incorporated by reference.

TECHNICAL FIELD OF THE INVENTION

The present invention relates generally to velocity estimation, and in particular, to an apparatus and method for efficiently estimating the velocity of a mobile station (MS) moving at low speed in a mobile communication system.

BACKGROUND OF THE INVENTION

Mobile communication systems need resource allocation based on accurate channel information in order to support large-capacity multimedia packet services with limited frequency/channel resources. As one of the important channel characteristics representing a channel state, users' velocities are used for efficient management of radio resources. For example, if a mobile communication system is to determine whether to allocate a resource to an MS, it may use the velocity information of the MS to determine whether the MS will stay in its own cell for a long time.

Examples of the conventional MS velocity estimation method include a velocity estimation method based on a covariance function and a velocity estimation method based on an autocorrelation function of a received signal in the time domain.

The velocity estimation based on a covariance function and the velocity estimation method based on an autocorrelation function of a received signal measure the maximum Doppler frequency of a received signal to detect the velocity mapped to the maximum Doppler frequency. That is, the conventional velocity estimation methods estimate the velocity by predicting a change in the covariance function or the autocorrelation function depending on the Doppler spread.

If there is a sufficient measurement time, the above velocity estimation methods can estimate the accurate velocity of an MS regardless of high-speed, medium-speed or low-speed environments. However, time limitations are inevitable in order to measure the MS velocity that varies in real time. The velocity estimation error increases particularly in low-speed environments. Also, the noise influence increases particularly in low-speed environments, thus making it impossible to reliably identify a low-speed MS.

Figure 1:
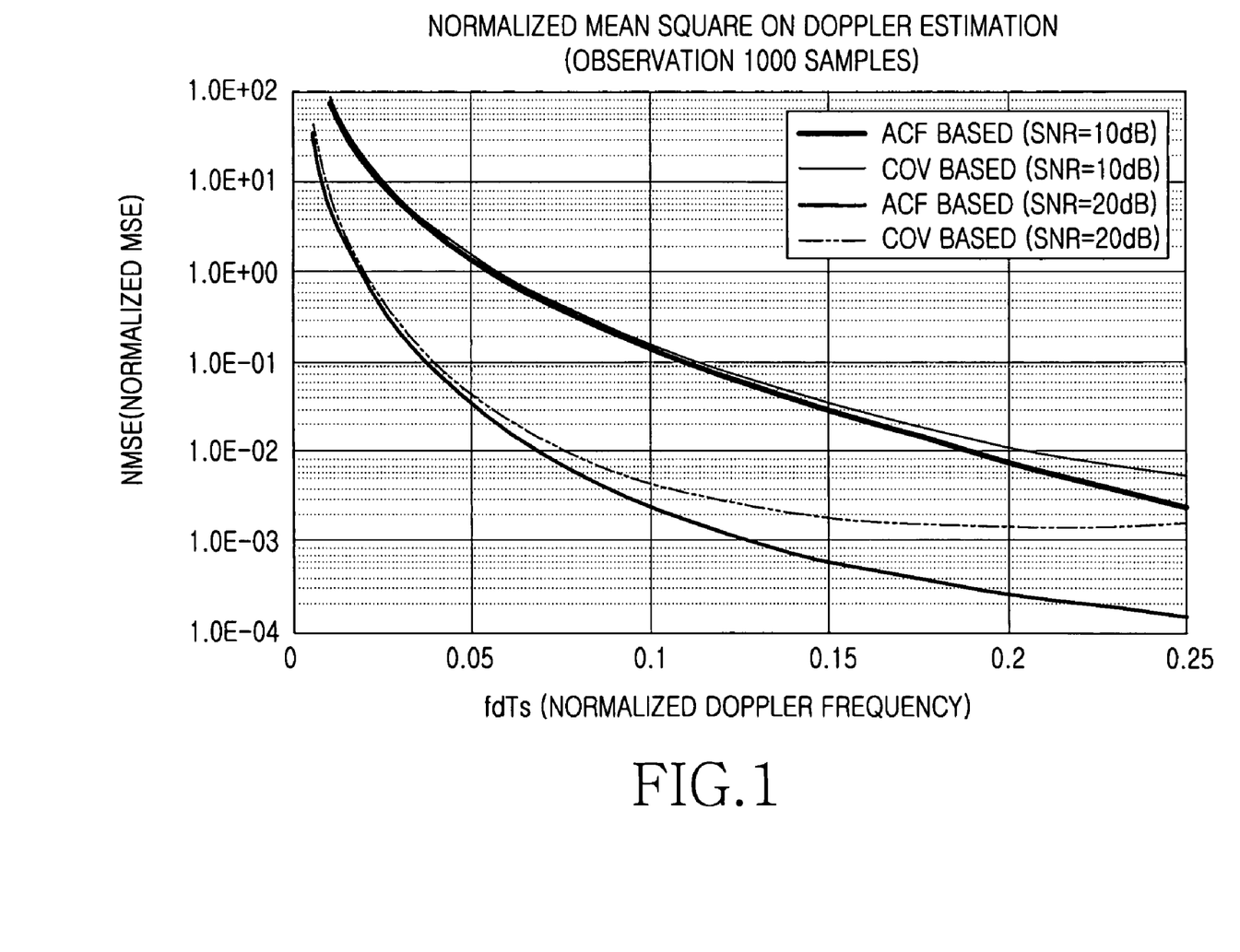
FIG. 1 illustrates a graph for a velocity estimation error depending on a Doppler frequency in the conventional art.

FIG. 1 illustrates a velocity estimation error depending on a Doppler frequency in the conventional art.

Referring to FIG. 1, the axis of abscissas represents a normalized Doppler frequency $f_d T_s$ and the axis of ordinates represents a means error value NMSE (Normalized Mean Square Error). Herein, $f_d$ denotes the maximum Doppler frequency and $T_s$ denotes a sampling period.

The graph of FIG. 1 shows the mean error values estimated using every 1000 samples of a signal with a Signal-to-Noise Ratio (SNR) of 10 dB and a signal with an SNR of 20 dB in Rayleigh Fading environments.

It may be seen from the graph of FIG. 1 that in high 20 dB SNR environments, the mean error is equal to or smaller than $10^{-1}$ in a high-speed region of $f_d T_s \geqq 0.05$ and the mean error increases suddenly in a low-speed region of $f_d T_s \leqq 0.05$. In low 10 dB SNR environments, reliable estimation may be achieved only in a high-speed region of $f_d T_s \geqq 0.1$.

In a mobile communication system using a 2 GHz band, the velocity of an MS corresponding to $f_d T_s = 0.05$ corresponds to 27 km/h in the case of applying a symbol rate of 1 k. Thus, in the case of applying the conventional method, the velocity of an MS in an $f_d T_s \leqq 0.05$ region may be inaccurately estimated even when an SNR is sufficiently high (e.g., about 20 dB).

In the conventional art, a large error in the estimation of the velocity of a low-speed MS may be caused by the following three reasons. The first reason is that the inverse of a Bessel function used to estimate the maximum Doppler frequency operates more sensitively in a low-speed region of $f_d T_s \leqq 0.05$.

Figure 2:
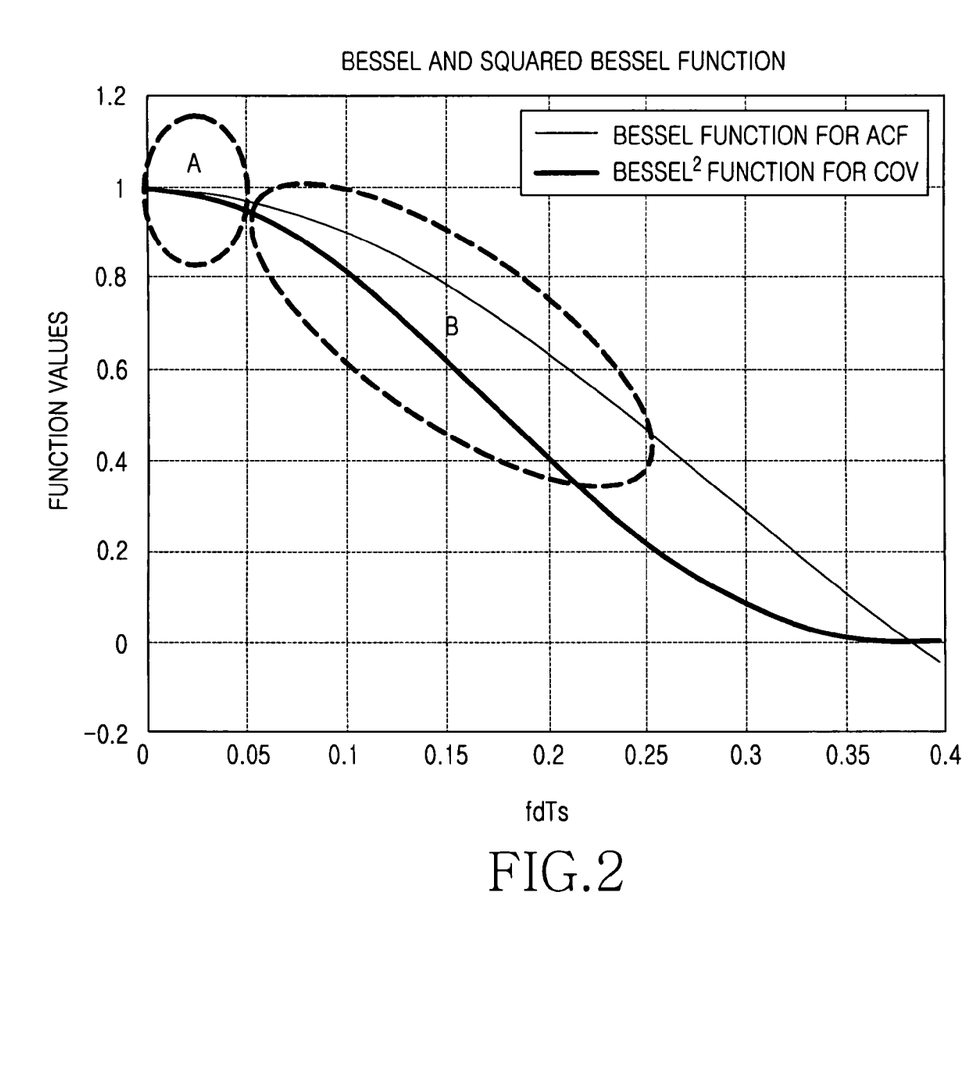
FIG. 2 illustrates a graph for a Bessel function and a squared Bessel function according to the conventional art.

FIG. 2 illustrates a Bessel function and a squared Bessel function according to the conventional art.

Referring to FIG. 2, a change in the estimated $f_d T_s$ according to a change in the measured mean error value is small in a high-speed $f_d T_s \geqq 0.05$ region 'B'. Alternatively, a change in the estimated $f_d T_s$ according to a change in the measured mean error value increases greatly in a low-speed $f_d T_s \leqq 0.05$ region 'A'. This phenomenon occurs prominently when an instantaneous change of the measured signal increases due to a reduced measurement time.

The second reason is that the influence of an over bias caused by an additive noise occurs more prominently in the low-speed region. That is, because the additive noise occurs uniformly by the sampling period and the SNR independently of the velocity of the MS, the influence of the additive noise increases in the low-speed region due to the sensitivity to a change of the measured value in the low-speed region.

The third region is that the measured value is distorted by the noise if the SNR value is unknown in the velocity estimation.

Figure 3:
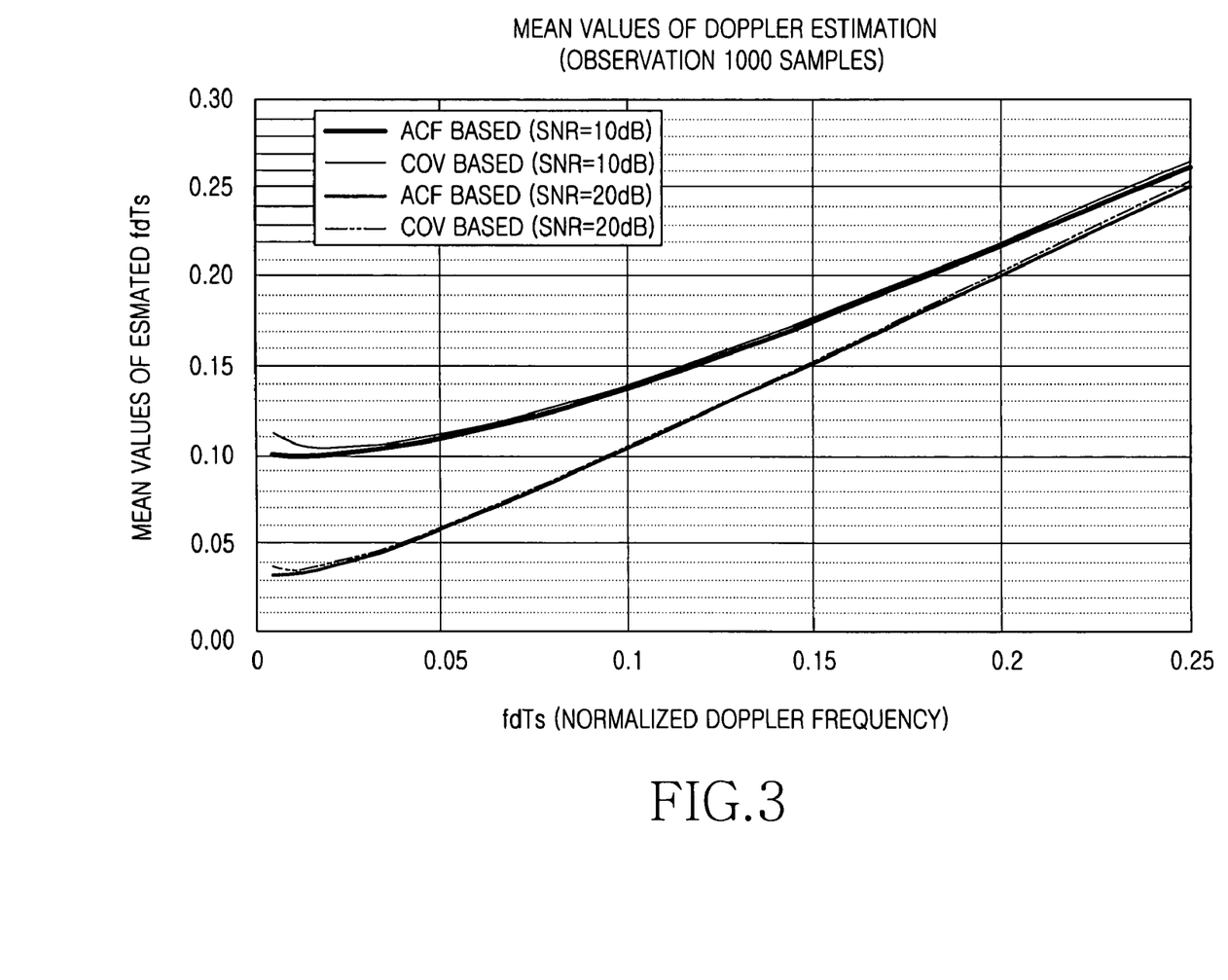
FIG. 3 illustrates a graph for estimation mean values for an SNR of 10 dB and an SNR of 20 dB according to the conventional art.

FIG. 3 illustrates estimation mean values for an SNR of 10 dB and an SNR of 20 dB according to the conventional art.

Referring to FIG. 3, the axis of abscissas represents a normalized Doppler frequency $f_d T_s$ and the axis of ordinates represents an estimated Doppler frequency. Herein, $f_d$ denotes the maximum Doppler frequency and $T_s$ denotes a sampling period.

It may be seen from the graph of FIG. 3 that an over bias in a low-speed region occurs very seriously if there is an additive noise.

What is therefore required is an apparatus and method for errorlessly estimating the velocity of a low-speed MS in a mobile communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for velocity estimation in a mobile communication system.

Another aspect of the present invention is to provide an apparatus and method for accurately estimating the velocity of a low-speed MS in a mobile communication system.

According to an aspect of the present invention, a method for velocity estimation in a mobile communication system includes: delaying a received signal by a plurality of different sample intervals; estimating a candidate maximum Doppler frequency for each of the delayed received signals delayed by the different sample intervals; and selecting a maximum Doppler frequency in a reliable period among the candidate maximum Doppler frequencies.

According to another aspect of the present invention, an apparatus for velocity estimation in a mobile communication system includes: a plurality of delayers configured to delay a received signal by a plurality of different sample intervals; an estimator configured to estimate a candidate maximum Doppler frequency for each of the delayed received signals delayed by the different sample intervals; and a selector configured to select a maximum Doppler frequency in a reliable period among the candidate maximum Doppler frequencies.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain exemplary embodiments of the present invention will become more apparent from the following detailed description when taken in conjunction with the accompanying drawings in which.

DETAILED DESCRIPTION OF THE INVENTION

FIGS. 4 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

The present invention provides an apparatus and method for reducing an error in the estimation of the velocity of an MS moving at low speed in a mobile communication system.

The present invention provides a method for estimating the optimal MS velocity on the basis of autocorrelation or covariance by applying a plurality of different sample intervals.

Figure 4:
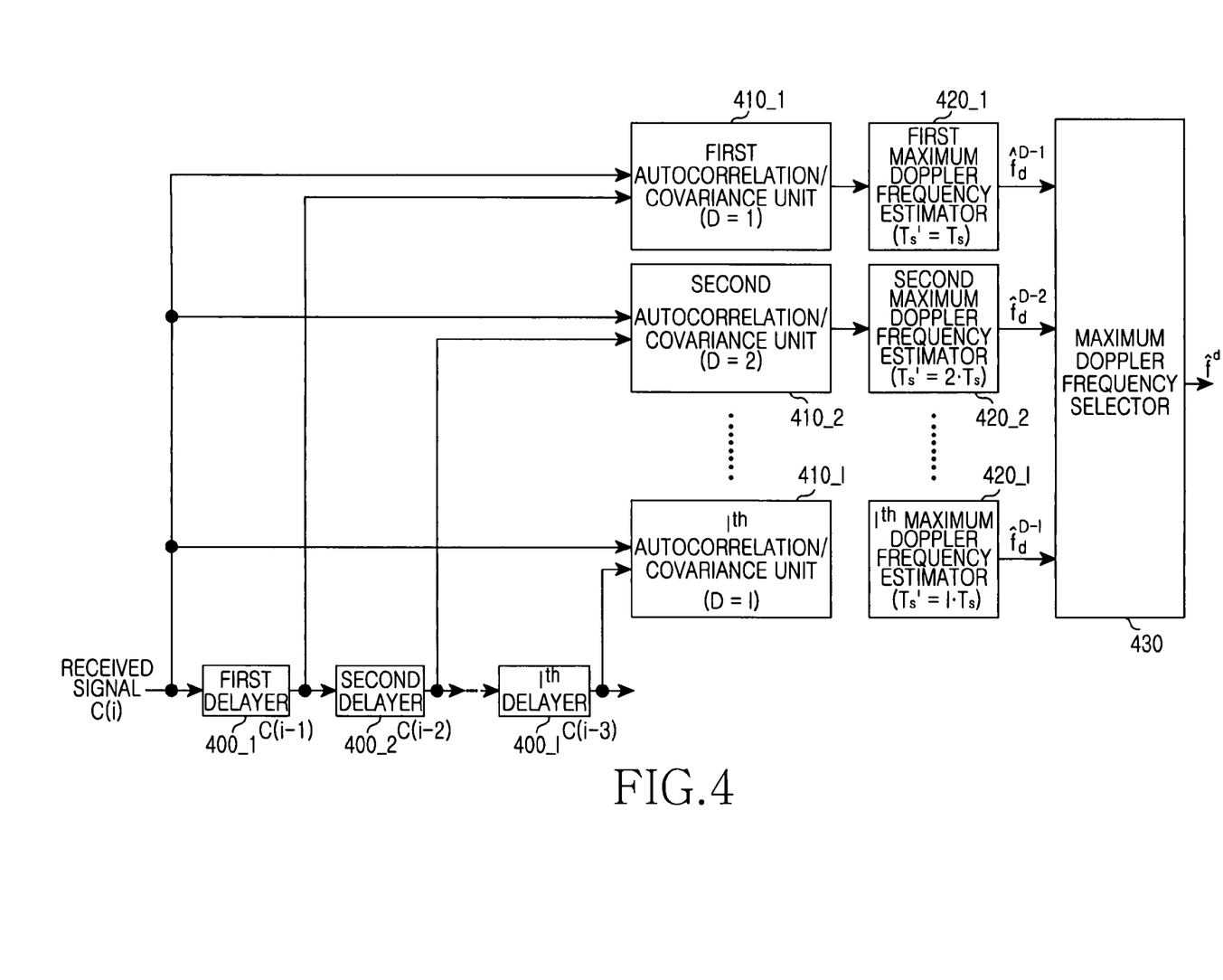
FIG. 4 illustrates an apparatus for errorlessly estimating the velocity of an MS moving at low speed in a mobile communication system, according to an exemplary embodiment of the present invention.

FIG. 4 is a block diagram of an apparatus for errorlessly estimating the velocity of an MS moving at low speed in a mobile communication system, according to an exemplary embodiment of the present invention.

Referring to FIG. 4, the velocity estimation apparatus includes first to $l^{th}$ delayers 400_1 to 400_$l$, first to $l^{th}$ autocorrelation/covariance units 410_1 to 410_$l$, first to $l^{th}$ maximum Doppler frequency estimators 420_1 to 420_$l$, and a maximum Doppler frequency selector 430.

Each of the first to $i^{th}$ delayers 400_1 to 400_$l$ delays a received signal according to each delay sample and outputs the resulting signal to each of the first to $l^{th}$ autocorrelation/covariance units 410_1 to 410_$l$.

For example, the first delayer 400_1 delays the received signal by a 1-sample interval and outputs the resulting signal to the first autocorrelation/covariance unit 410_1 and the second delayer 400_2. The second delayer 400_2 delays the output signal of the first delayer 400_1 by a 1-sample interval and outputs the resulting signal to the third autocorrelation/covariance unit 410_3 and the third delayer 400_3. Consequently, the second delayer 400_2 delays the received signal by a 2-sample interval and outputs the resulting signal to the third autocorrelation/covariance unit 410_3 and the third delayer 400_3. According to embodiments, the first to $l^{th}$ delayers 400_1 to 400_$l$ may delay the received signal by the respective delay values (1 sample, 2 samples, ..., $l$ samples).

Each of the first to $l^{th}$ autocorrelation/covariance units 410_1 to 410_$l$ calculates the maximum Doppler frequency on the basis of the covariance and the autocorrelation between the received signal C(i) and the delayed received signal C(i−1).

Herein, when measuring the covariance or the autocorrelation for the received signal, if delaying the measured signal by an l-sample interval (D=l), the maximum Doppler frequency may be expressed as Equations 1 and 2:

$$\hat{f}_d^{ACF(D=l)} = \frac{1}{2\pi \cdot l \cdot T_S} J_0^{-1}\left(\frac{\gamma+1}{\gamma}\frac{\phi_l}{\phi_0} - \frac{\text{sinc}(B_m T_S)}{\gamma}\right) \quad [\text{Eqn. 1}]$$

where $\hat{f}_d^{ACF(D=l)}$ denotes the maximum Doppler frequency based on autocorrelation, l denotes the number of samples, $T_s$ denotes a sampling period, γ denotes an SNR, $B_m$ denotes a noise bandwidth, $\phi_l$ denotes the autocorrelation function value between the received signals spaced apart by the $l^{th}$ sampling, J(•) denotes a Bessel function, and sinc(•) denotes a sinc function.

$$\hat{f}_d^{COV(D=l)} = \quad [\text{Eqn. 2}]$$
$$\frac{1}{2\pi \cdot l \cdot T_S} J_0^{-1}\left(\frac{\gamma+1}{\gamma}\sqrt{1 - \frac{V_l}{2\text{Var}(a^2(i))}} - \frac{\text{sinc}(B_m T_S)}{\gamma}\right)$$

where $\hat{f}_d^{COV(D=l)}$ denotes the maximum Doppler frequency based on covariance, l denotes the number of samples, $T_s$ denotes a sampling period, γ denotes an SNR, $B_m$ denotes a noise bandwidth, a(i) denotes the envelope of a received signal, Var(•) denotes a variance function, J(•) denotes a Bessel function, and sinc(•) denotes a sinc function.

The influences of the noises on the maximum Doppler frequencies in Equations 1 and 2 are identical because the noise bandwidth increases with an increase in the sample interval.

As expressed in Equations 1 and 2, the estimation of the maximum Doppler frequency based on the sample with increased delay has the following characteristics.

Firstly, when estimating the maximum Doppler frequency corresponding to a low speed, in applying the inverse of a Bessel function, the characteristics of the region 'B' (see FIG. 2) less sensitive to a change of the measured value are applied to the region 'A' (see FIG. 2) sensitive to a change of the measured value. Thus, the sensitivity of a velocity estimation value for a low-speed MS decreases to the sensitivity of the estimation value for the medium speed or more.

Secondly, when estimating the maximum Doppler frequency corresponding to a low speed, the difference of a change in covariance or autocorrelation according to the secondary characteristics of a fading signal from the characteristics of covariance or autocorrelation according to the secondary characteristics of a noise decreases. By approximation of Equations 1 and 2, the conditions for equalization of the covariances or autocorrelations of a Rayleigh fading signal and a noise are derived as Equation 3:

$$f_d \approx \sqrt{\frac{2}{3}} \cdot B_m \quad [\text{Eqn. 3}]$$

where $f_d$ denotes the maximum Doppler frequency and $B_m$ denotes a noise bandwidth.

Thus, the noise bandwidth for a signal delayed by a sample interval decreases to $B_m = B_m/l$ so that the over bias caused by the noise in the low-speed region decreases.

Thirdly, if a delayed sample is used, the observable maximum Doppler frequency decreases. This is because an inverse Bessel function used in estimation or a unique region of a squared inverse Bessel function decreases. Thus, the reliable range of measurement based on a delayed sample decreases with an increase in delay.

The maximum Doppler frequency selector 430 selects a candidate maximum Doppler frequency in the most reliable period, among the maximum Doppler frequency values received from the first to $l^{th}$ autocorrelation/covariance units 410_1 to 410_$l$, to estimate the corresponding velocity of an MS. That is, the maximum Doppler frequency selector 430 selects the maximum Doppler frequency by using the application result of a small-delay sample in a high-speed region and the application result of a large-delay sample in a low-speed region.

Figure 5:
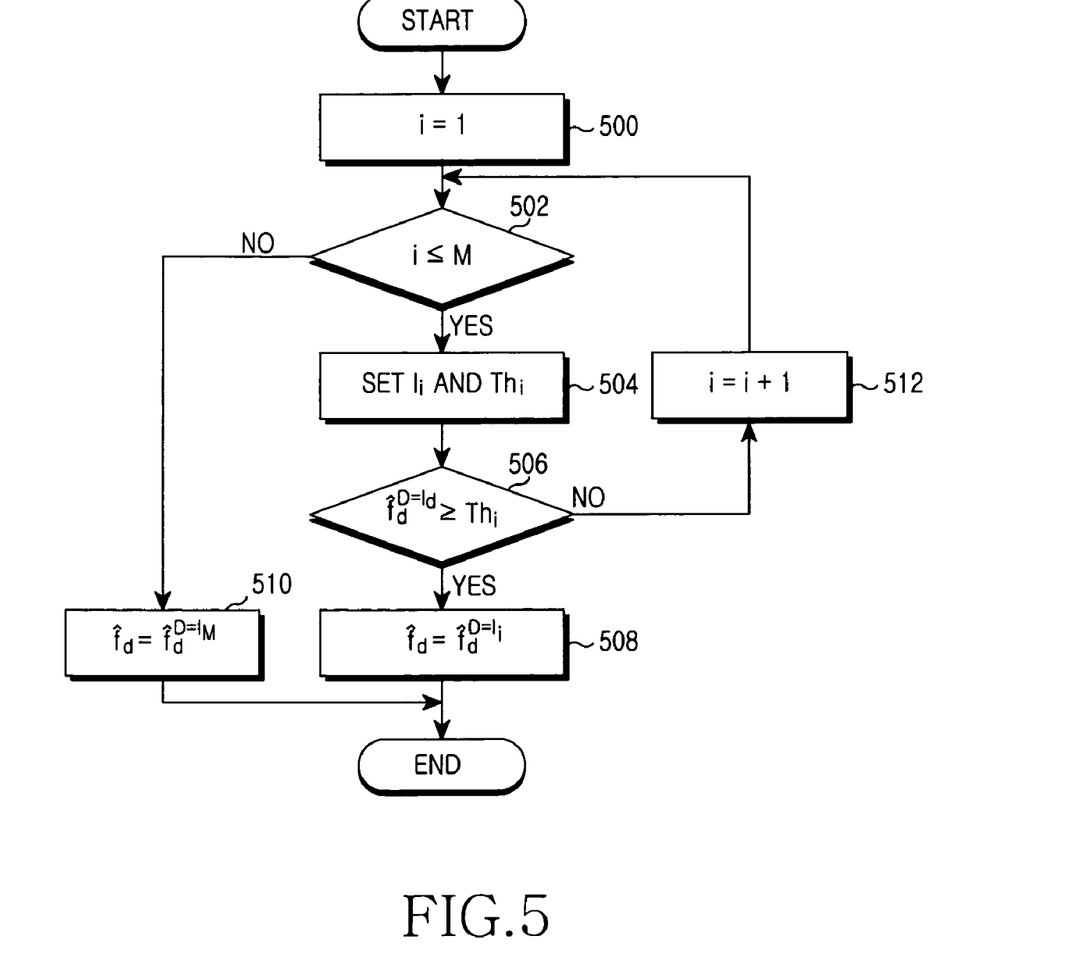
FIG. 5 illustrates a process for errorlessly estimating the velocity of an MS moving at low speed in a mobile communication system, according to an exemplary embodiment of the present invention.

FIG. 5 illustrates a process for errorlessly estimating the velocity of an MS moving at low speed in a mobile communication system, according to an exemplary embodiment of the present invention.

Referring to FIG. 5, the velocity estimation apparatus sets i=1 in step 500. Herein, i is a parameter for selecting a plurality of candidate maximum Doppler frequencies.

In step 502, the velocity estimation apparatus determines whether i is smaller than or equal to M. Herein, M denotes the total number of candidate maximum Doppler frequencies outputted from the maximum Doppler frequency selector 430.

If i is smaller than or equal to M (in step 502), the velocity estimation apparatus proceeds to step 504. In step 540, the velocity estimation apparatus selects a delay sample 4 corresponding to i and a threshold value $Th_i$ corresponding to i.

In step 506, the velocity estimation apparatus determines whether the maximum Doppler frequency $\hat{f}_d^{D=li}$ based on covariance or autocorrelation based on the delay sample $l_i$ is equal to or greater than the threshold value Thi. If the maximum Doppler frequency $\hat{f}_d^{D=li}$ is equal to or greater than the threshold value $Th_i$ (in step 506), the velocity estimation apparatus proceeds to step 508. In step 508, the velocity estimation apparatus sets the maximum Doppler frequency satisfying the above conditions to $\hat{f}_d^{D=l_i}$.

If the maximum Doppler frequency $\hat{f}_d^{D=li}$ smaller than the threshold value $Th_i$ (in step 506), the velocity estimation apparatus increases i in step 512 and returns to step 502.

If i is greater than M (in step 502), the velocity estimation apparatus proceeds to step 510. In step 510, the velocity estimation apparatus sets the maximum Doppler frequency to $\hat{f}_d^{D=l(M)}$.

Thereafter, the velocity estimation apparatus ends the process of the present invention.

As described above, in FIG. 5, each of the M candidate maximum Doppler frequencies is a value obtained through sample delays $(l_1, l_2, \ldots, l_m)$ and they are arranged in the relationship of $l_i < l_{i+1}$.

Also, in FIG. 5, each of the (M−1) threshold values ($Th_1$, $Th_2$, ..., $Th_{M-1}$) is the minimum value of the reliable period of the maximum Doppler frequency measured with the corresponding delay and they have a relationship of $Th_i > Th_{i+1}$. Thus, in FIG. 5, the candidate maximum Doppler frequency selection method selects the candidate maximum Doppler frequency in the reliable period for each delay. The threshold values and the delay values for the M candidate maximum Doppler frequencies in the present invention may be determined according to the system requirement and efficiency.

FIGS. 6 to 9 are graphs illustrating velocity estimation experiment results based on autocorrelation according to the present invention.

Figure 6:
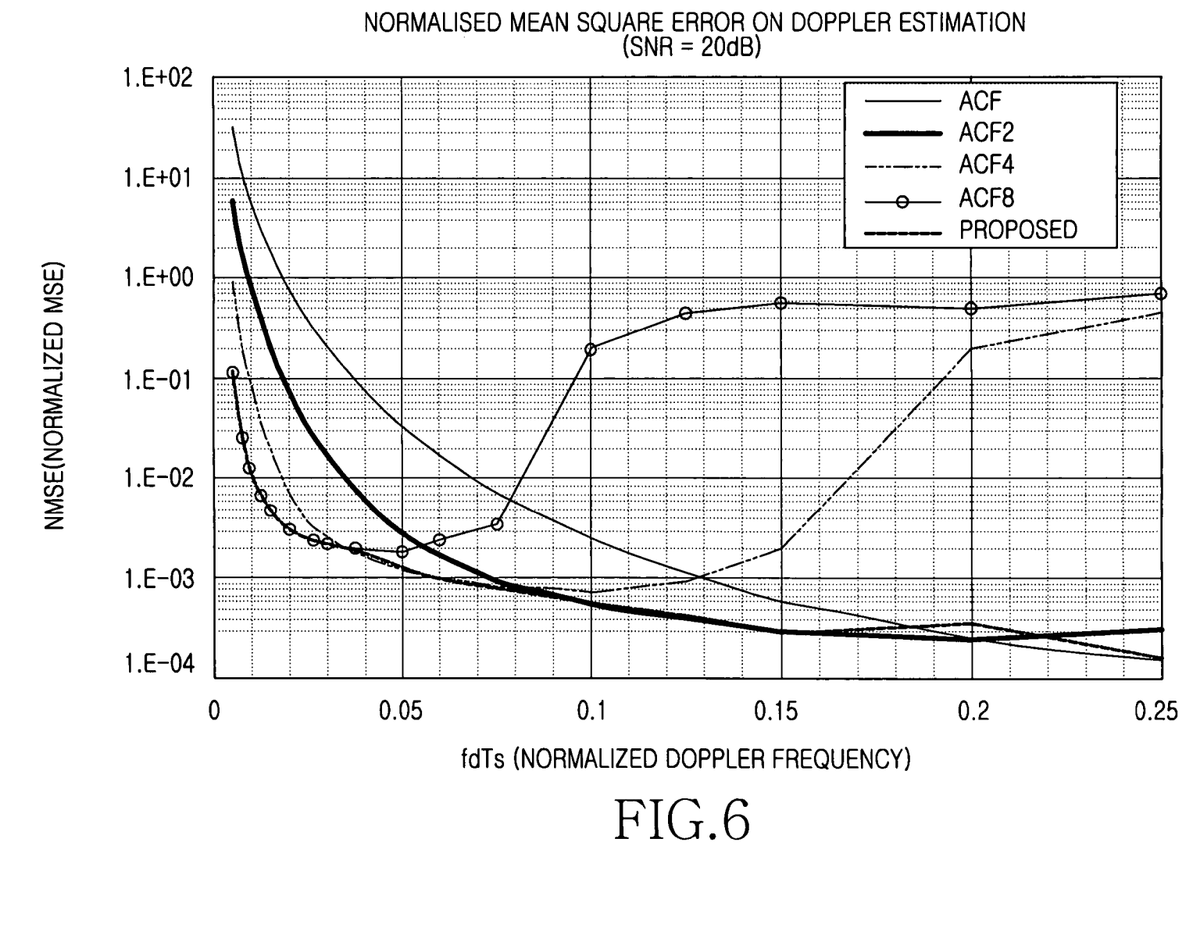
FIG. 6 illustrates a graph for velocity estimation experiment results based on autocorrelation according to the present invention.
Figure 7:
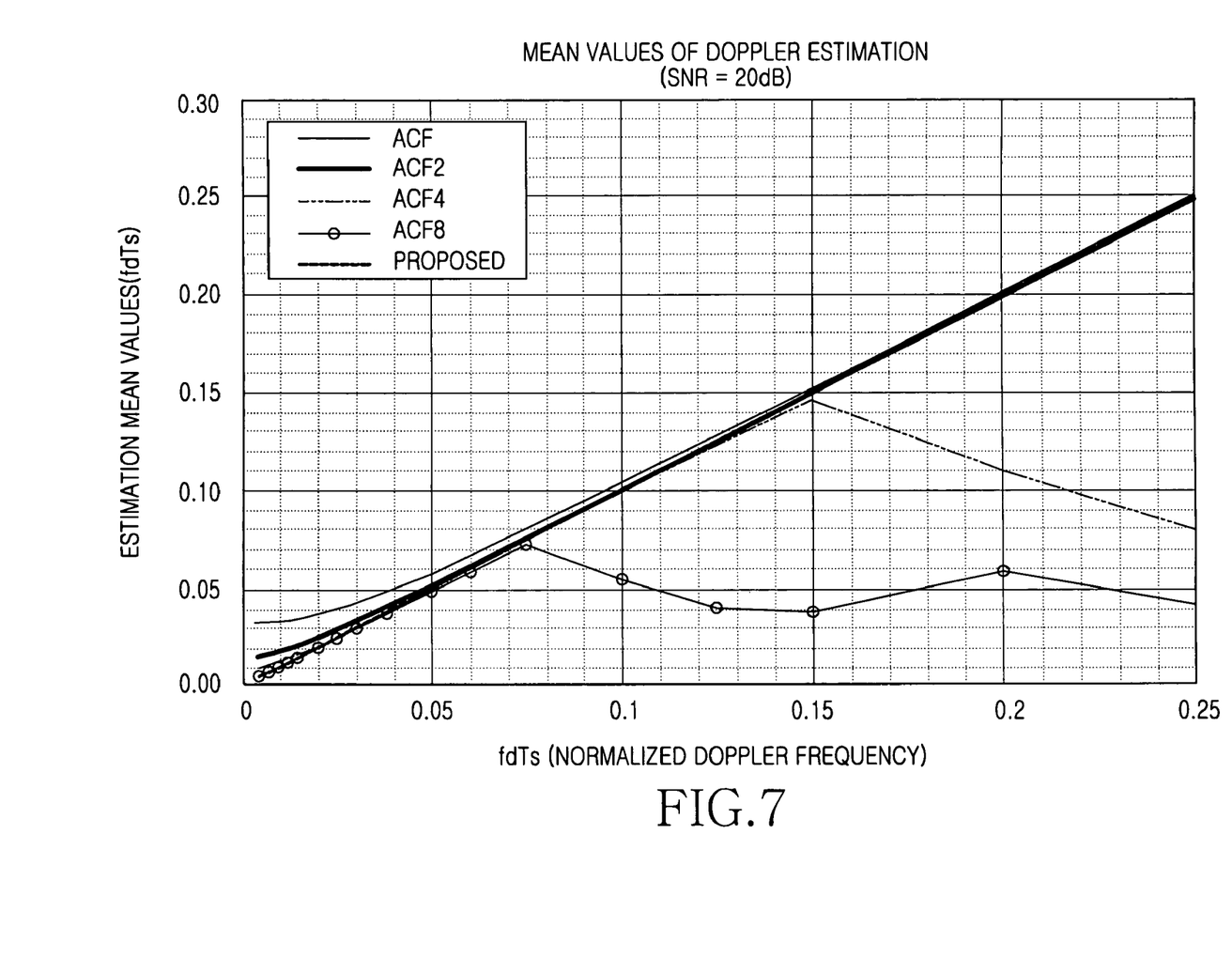
FIG. 7 illustrates a graph for velocity estimation experiment results based on autocorrelation according to the present invention.

The graphs of FIGS. 6 and 7 show the experimental results in the case of using 4 candidate maximum Doppler frequencies (M=4) in 20 dB SNR environments. Herein, the 4 candidate maximum Doppler frequencies are delayed respectively by 1, 2, 4 and 8 samples ($l_1=1, l_2=2, l_3=4, l_4=8$) and the threshold values for the candidate maximum Doppler frequencies are respectively $Th_1=0.2, Th_2=0.085, Th_3=0.035$.

In FIGS. 6 and 7, 'ACF', 'ACF2', 'ACF4' and 'ACF8' are respectively the experimental results for sample delays of 1, 2, 4 and 8, and 'Proposed' is the experimental result according to the present invention.

As a result of the comparison of normalized MSEs, it may be seen from FIG. 6 that the method of the present invention may greatly reduce the estimation error for the low speed in comparison with the conventional method 'ACF'.

As a result of the comparison of estimation mean values, it may be seen from FIG. 7 that the method of the present invention may greatly reduce the over bias in comparison with the conventional method 'ACF'.

Figure 8:
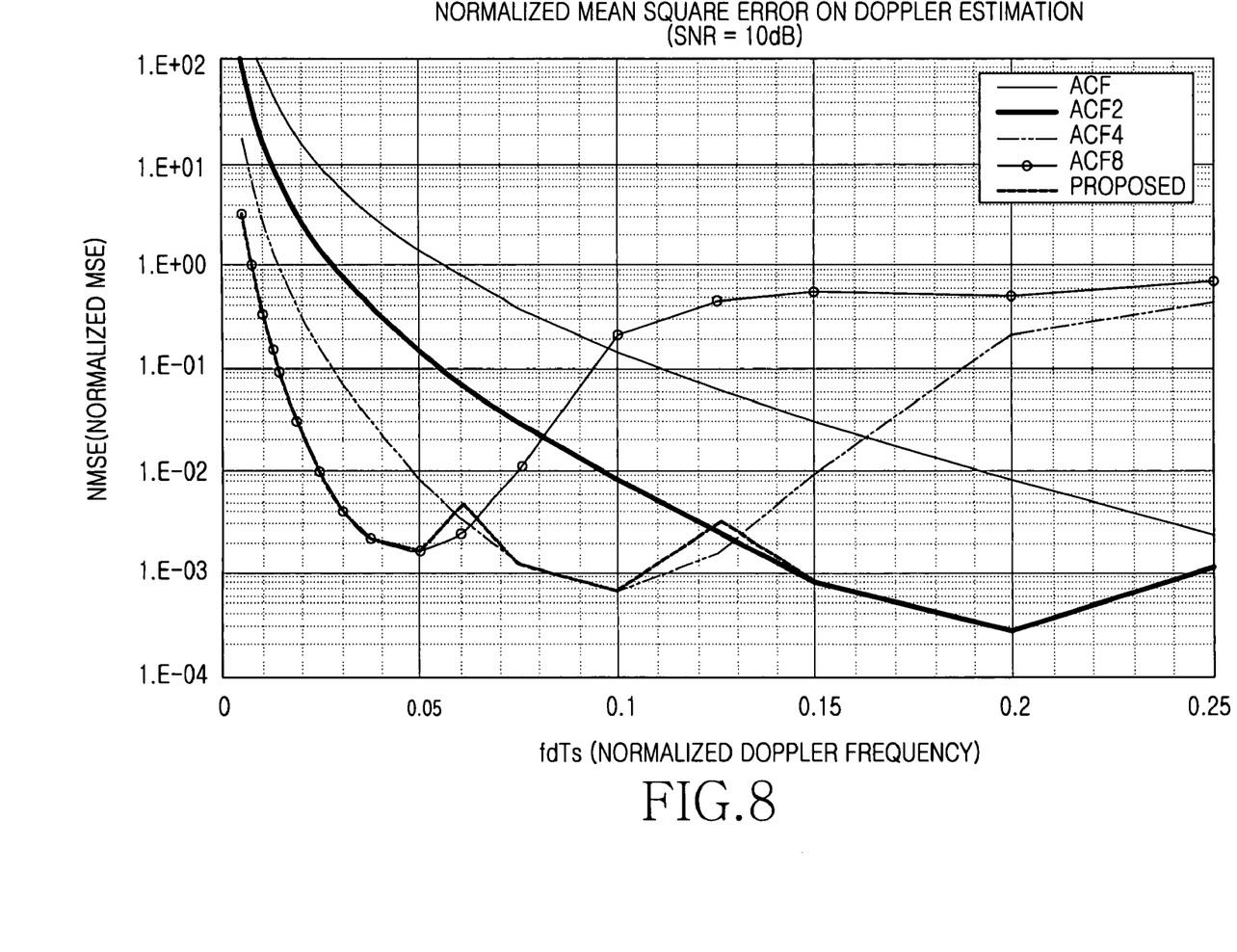
FIG. 8 illustrates a graph for velocity estimation experiment results based on autocorrelation according to the present invention.
Figure 9:
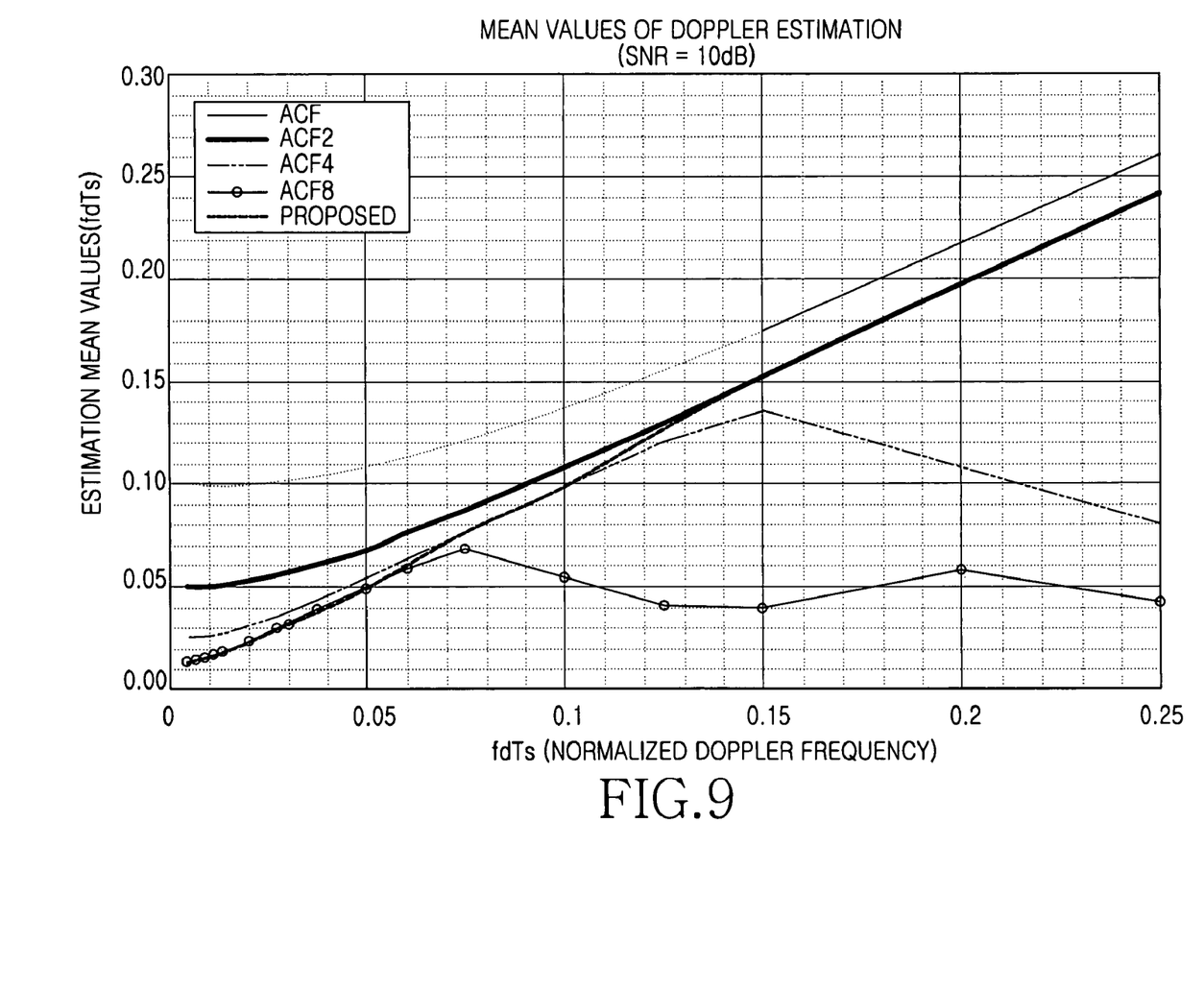
FIG. 9 illustrates a graph for velocity estimation experiment results based on autocorrelation according to the present invention.

The graphs of FIGS. 8 and 9 show the experimental results in 10 dB SNR environments. Except the threshold values, the experimental environments of FIGS. 8 and 9 are identical to the experimental environments of FIGS. 6 and 7. The threshold values used in the 10 dB SNR environments are respectively $Th_1=0.27, Th_2=0.13, Th_3=0.061$.

When comparing the results of FIGS. 6 and 7 with the results of FIGS. 8 and 9, it may be seen that the performance improvement by the present invention increases with an increase in noise.

FIGS. 10 to 13 are graphs illustrating velocity estimation experiment results based on covariance according to the present invention.

Figure 10:
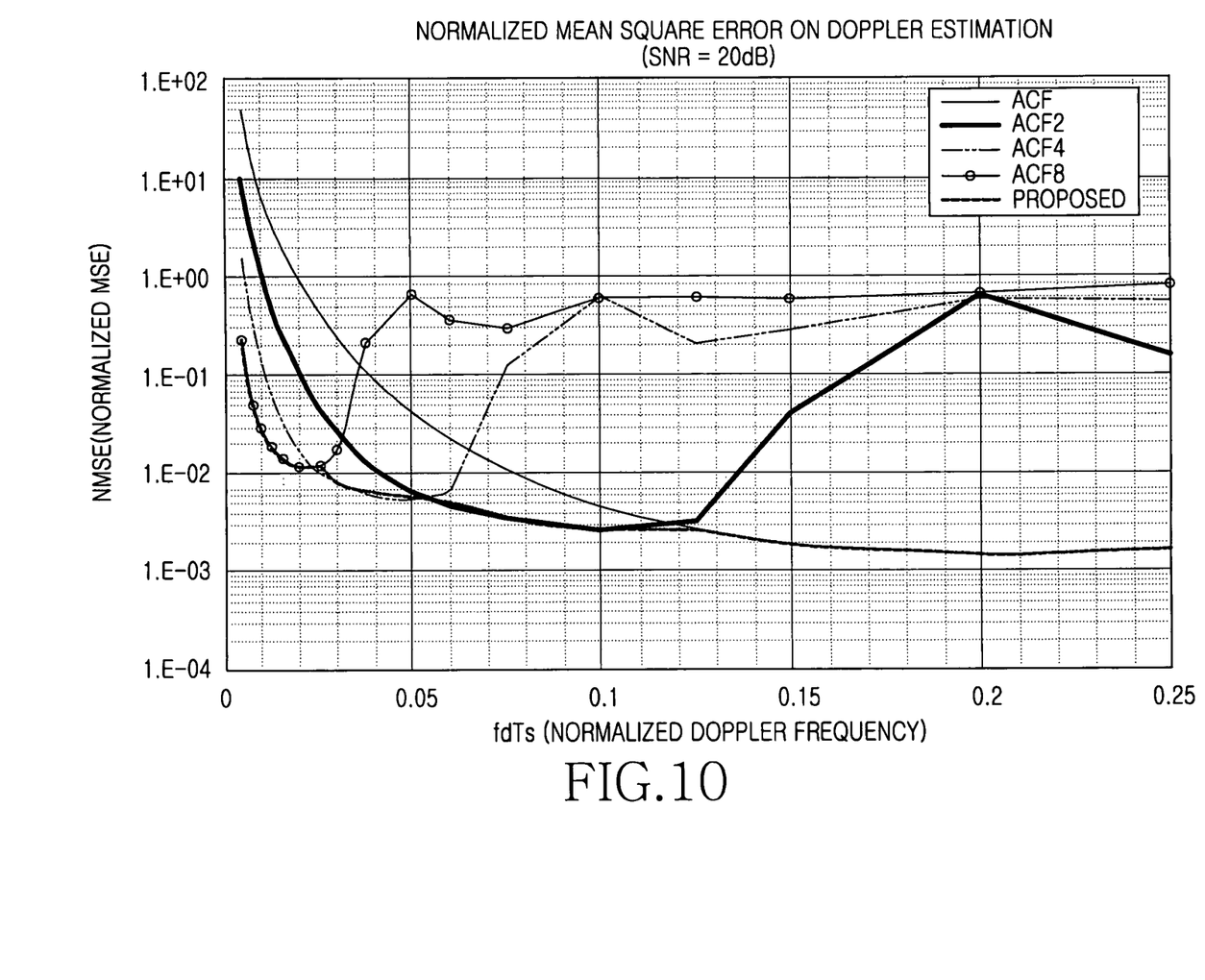
FIG. 10 illustrates a graph for velocity estimation experiment results based on covariance according to the present invention.
Figure 11:
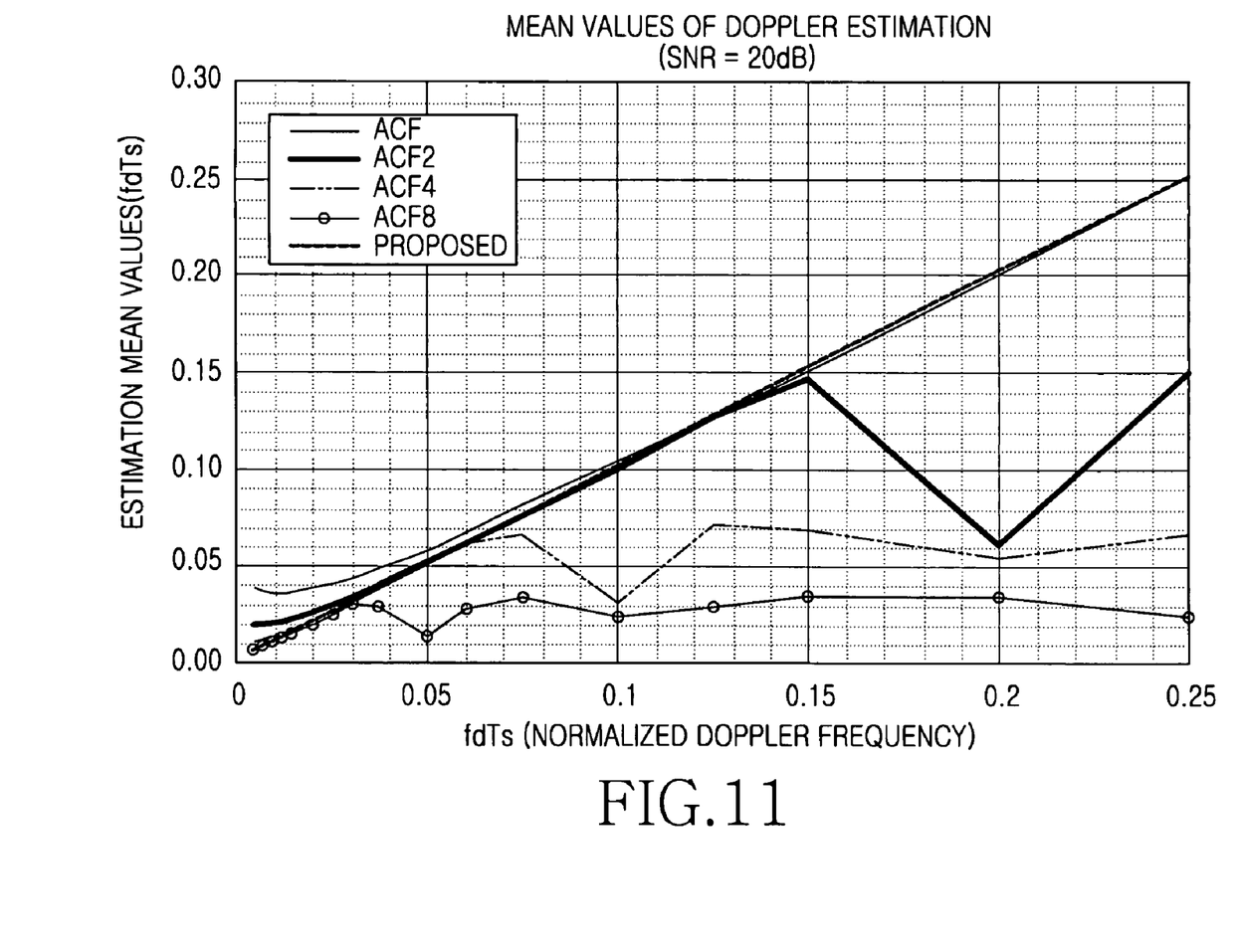
FIG. 11 illustrates a graph for velocity estimation experiment results based on covariance according to the present invention.

The graphs of FIGS. 10 and 11 show the experimental results in the case of using 4 candidate maximum Doppler frequencies (M=4) in 20 dB SNR environments. Herein, the delay samples for candidate maximum Doppler frequencies are identical to those of FIGS. 6 to 8 ($l_1=1, l_2=2, l_3=4, l_4=8$). The threshold values for the candidate maximum Doppler frequencies are respectively $Th_1=0.118, Th_2=0.057, Th_3=0.025$. In FIGS. 10 and 11, 'COV', 'COV2', 'COV4' and 'COV8' are respectively the experimental results for sample delays of 1, 2, 4 and 8, and Proposed' is the experimental result according to the present invention.

As a result of the comparison of normalized MSEs and mean values, it may be seen from FIGS. 10 and 11 that the method of the present invention may greatly reduce the over bias and the estimation error for the low speed in comparison with the conventional method 'COV'.

Figure 12:
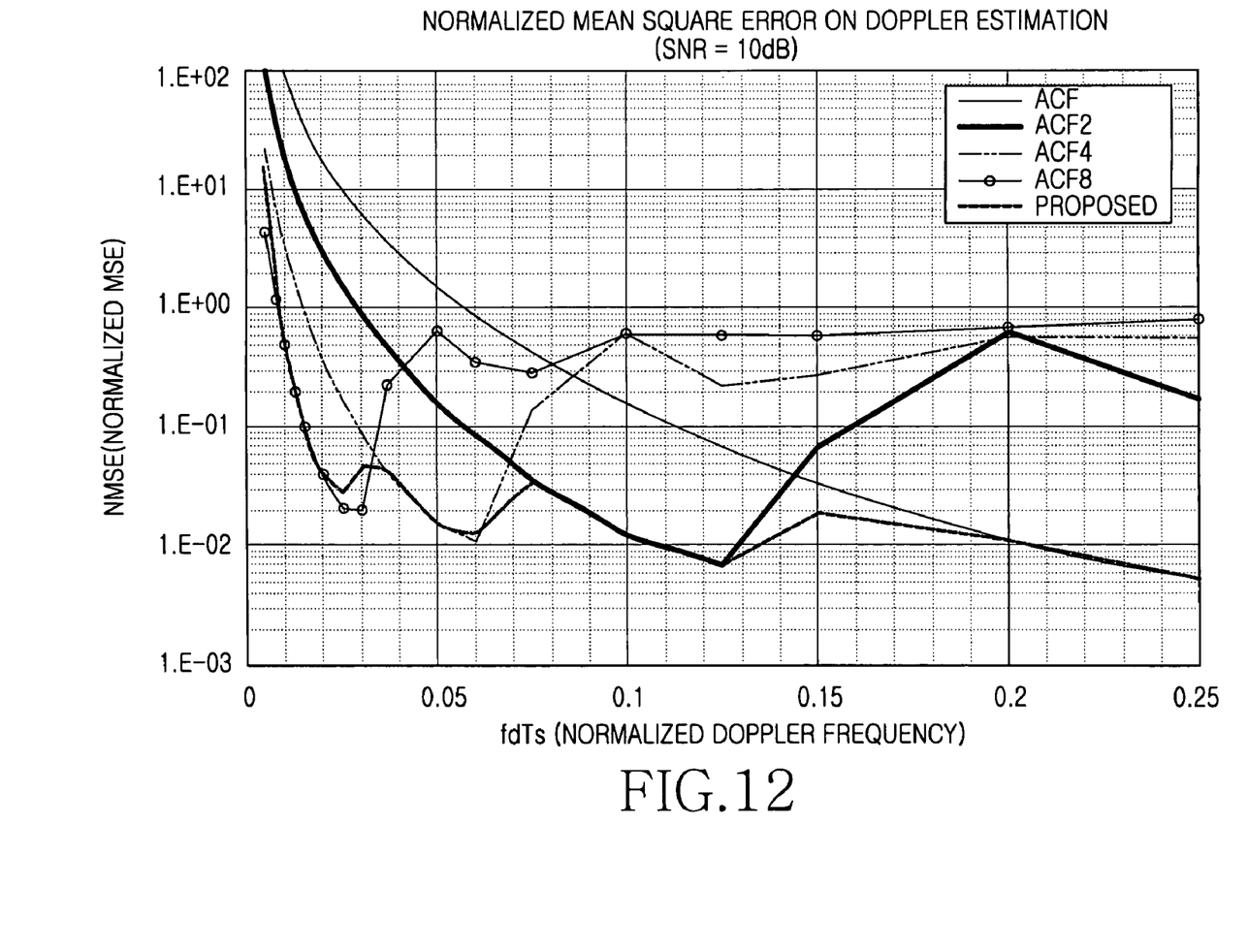
FIG. 12 illustrates a graph for velocity estimation experiment results based on covariance according to the present invention.
Figure 13:
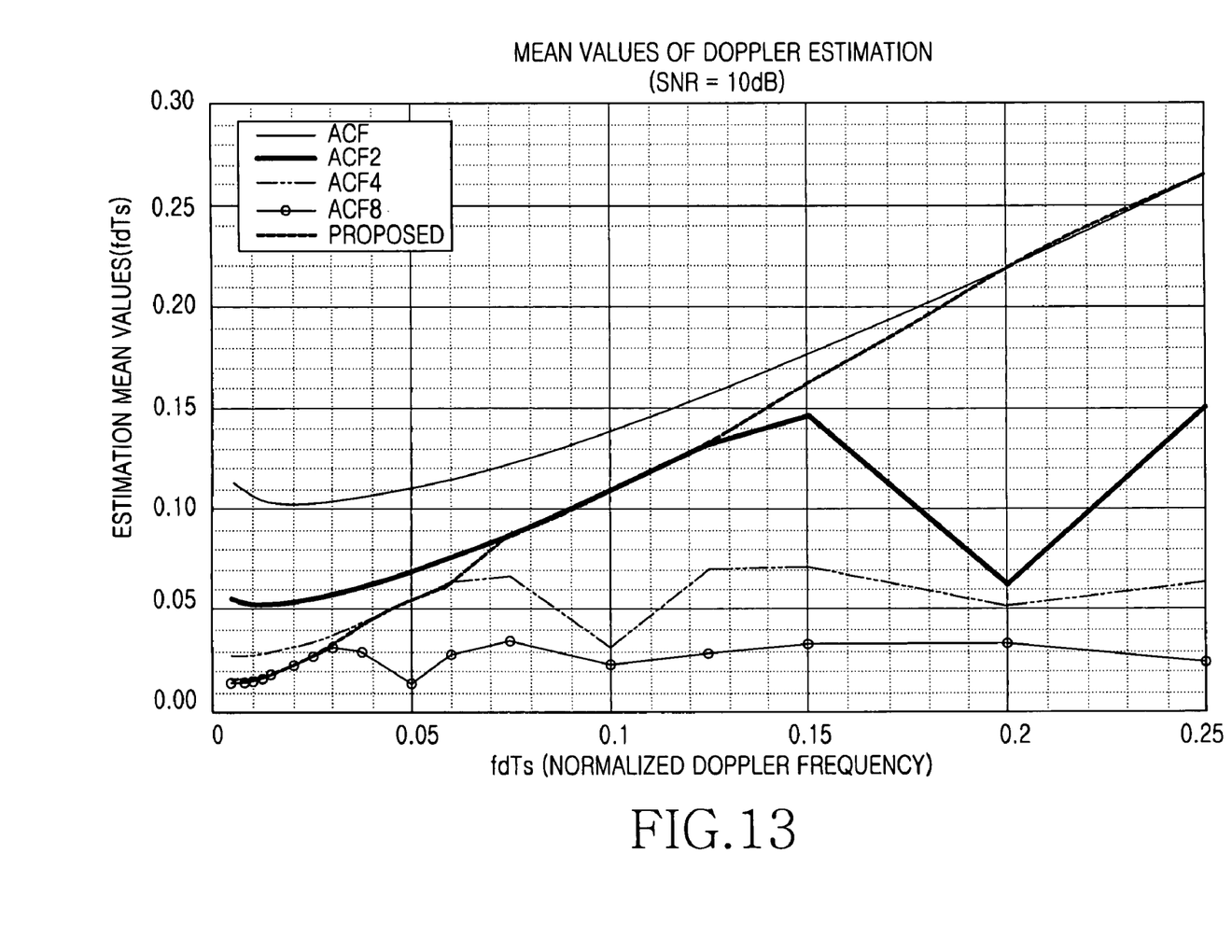
FIG. 13 illustrates a graph for velocity estimation experiment results based on covariance according to the present invention.

The graphs of FIGS. 12 and 13 show the experimental results in 10 dB SNR environments. Except the threshold values, the experimental environments of FIGS. 12 and 13 are identical to the experimental environments of FIGS. 10 and 11. The threshold values used in the 10 dB SNR environments are respectively $Th_1=0.18, Th_2=0.085, Th_3=0.04$. When comparing the results of FIGS. 10 and 11 with the results of FIGS. 12 and 13, it may be seen that the performance improvement by the present invention increases with an increase in noise.

As described above, the present invention applies a low sampling delay for a high speed and a high sampling delay for a low speed in a mobile communication system, thereby providing good performance for the additive noise and the estimation of the velocity of a low-speed MS.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for velocity estimation in a mobile communication system, comprising:
   delaying a received signal by a plurality of different sample intervals to form a plurality of delayed received signals;
   estimating a candidate maximum Doppler frequency for each of the delayed received signals to form a plurality of candidate maximum Doppler frequencies; and
   selecting a maximum Doppler frequency in a reliable period from the candidate maximum Doppler frequencies, wherein the reliable period is based on a length of delay of the received signal and a speed range associated with the maximum Doppler frequency.

2. The method of claim 1, wherein the estimation of the candidate maximum Doppler frequency for each of the delayed received signals is determined by an autocorrelation function or a covariance function.

3. The method of claim 2, wherein the candidate maximum Doppler frequency determined by the autocorrelation function is determined by the following equation:

$$\hat{f}_d^{ACF(D=1)} = \frac{1}{2\pi \cdot 1 \cdot T_S} J_0^{-1}\left(\frac{\gamma+1}{\gamma}\frac{\phi_1}{\phi_0} - \frac{\text{sinc}(B_m T_S)}{\gamma}\right)$$

where $\hat{f}_d^{ACF(D=1)}$ denotes the maximum Doppler frequency based on autocorrelation, l denotes the number of samples, $T_S$ denotes a sampling period, $\gamma$ denotes a Signal-to-Noise Ratio (SNR), $B_m$ denotes a noise bandwidth, $\phi_l$ denotes the autocorrelation function value between the received signals spaced apart by the $l^{th}$ sampling, J(•) denotes a Bessel function, and sinc(•) denotes a sinc function.

4. The method of claim 2, wherein the candidate maximum Doppler frequency determined by the covariance function is determined by the following equation:

$$\hat{f}_d^{COV(D=1)} = \frac{1}{2\pi \cdot 1 \cdot T_S} J_0^{-1}\left(\frac{\gamma+1}{\gamma}\sqrt{1 - \frac{V_1}{2\text{Var}(a^2(i))}} - \frac{\text{sinc}(B_m T_S)}{\gamma}\right)$$

where $\hat{f}_d^{COV(d=1)}$ denotes the maximum Doppler frequency based on covariance, l denotes the number of samples, $T_S$ denotes a sampling period, $\gamma$ denotes an SNR, $B_m$ denotes a noise bandwidth, a(i) denotes the envelope of a received signal, Var(•) denotes a variance function, J(•) denotes a Bessel function, and sinc(•) denotes a sinc function.

5. The method of claim 1, wherein the maximum Doppler frequency is estimated less sensitively at low speed as a sample interval increases.

6. The method of claim 1, further comprising calculating the velocity corresponding to the selected maximum Doppler frequency.

7. The method of claim 1, wherein the selecting of the maximum Doppler frequency in the reliable period from the candidate maximum Doppler frequencies determines the maximum Doppler frequency by comparing M candidate maximum Doppler frequencies, determined through sample delays ($l_1, l_2, \ldots, L_m$), with (M−1) threshold values ($Th_1, Th_2, \ldots, Th_{M-1}$) in a reliable period of the maximum Doppler frequencies measured with the corresponding delays, where $l_i < l_{i+1}$ and $Th_i > Th_{i+1}$.

8. The method of claim 7, wherein the threshold value ($Th_i$) and the delay value ($l_i$) for the candidate maximum Doppler frequency are determined according to the system requirement and efficiency.

9. An apparatus for velocity estimation in a mobile communication system, the apparatus comprising:
a plurality of delayers configured to delay a received signal by a plurality of different sample intervals to form a plurality of delayed received signals;
an estimator configured to estimate a candidate maximum Doppler frequency for each of the delayed received signals to form a plurality of candidate maximum Doppler frequencies; and
a selector configured to select a maximum Doppler frequency in a reliable period from the candidate maximum Doppler frequencies, wherein the reliable period is based on a length of delay of the received signal and a speed range associated with the maximum Doppler frequency.

10. The apparatus of claim 9, wherein the estimation of the candidate maximum Doppler frequency for each of the delayed received signals is determined by an autocorrelation function or a covariance function.

11. The apparatus of claim 10, wherein the candidate maximum Doppler frequency determined by the autocorrelation function is determined by the following equation:

$$\hat{f}_d^{ACF(D=l)} = \frac{1}{2\pi \cdot l \cdot T_S} J_0^{-1}\left(\frac{\gamma+1}{\gamma}\frac{\phi_l}{\phi_0} - \frac{\mathrm{sinc}(B_m T_S)}{\gamma}\right)$$

where $\hat{f}_d^{ACF(D=l)}$ denotes the maximum Doppler frequency based on autocorrelation, l denotes the number of samples, $T_S$ denotes a sampling period, $\gamma$ denotes a Signal-to-Noise Ratio (SNR), $B_m$ denotes a noise bandwidth, $\phi_l$ denotes the autocorrelation function value between the received signals spaced apart by the $l^{th}$ sampling, $J(\bullet)$ denotes a Bessel function, and $\mathrm{sinc}(\bullet)$ denotes a sinc function.

12. The apparatus of claim 10, wherein the candidate maximum Doppler frequency determined by the covariance function is determined by the following equation:

$$\hat{f}_d^{COV(D=l)} = \frac{1}{2\pi \cdot l \cdot T_S} J_0^{-1}\left(\frac{\gamma+1}{\gamma}\sqrt{1 - \frac{V_1}{2\mathrm{Var}(a^2(i))}} - \frac{\mathrm{sinc}(B_m T_S)}{\gamma}\right)$$

where $\hat{f}_d^{COIV(D=l)}$ denotes the maximum Doppler frequency based on covariance, l denotes the number of samples, $T_S$ denotes a sampling period, $\gamma$ denotes an SNR, $B_m$ denotes a noise bandwidth, a(i) denotes the envelope of a received signal, Var($\bullet$) denotes a variance function, $J(\bullet)$ denotes a Bessel function, and $\mathrm{sinc}(\bullet)$ denotes a sinc function.

13. The apparatus of claim 9, wherein the maximum Doppler frequency is estimated less sensitively at low speed as a sample interval increases.

14. The apparatus of claim 9, wherein the selector is further configured to calculate the velocity corresponding to the selected maximum Doppler frequency.

15. The apparatus of claim 9, wherein the selector is further conigured to determine the maximum Doppler frequency by comparing M candidate maximum Doppler frequencies, determined through sample delays ($l_1, l_2, \ldots, L_m$), with (M−1) threshold values ($Th_1, Th_2, \ldots, Th_{M-1}$) in a reliable period of the maximum Doppler frequencies measured with the corresponding delays, where $l_i < l_{i+1}$ and $Th_i > Th_{i+1}$.

16. The apparatus of claim 15, wherein the threshold value ($Th_i$) and the delay value ($l_i$) for the candidate maximum Doppler frequency are determined according to the system requirement and efficiency.

17. A base station capable of performing velocity estimation in a mobile communication system, the base station comprising:
a plurality of delayers configured to delay a received signal by a plurality of different sample intervals to form a plurality of delayed received signals;
an estimator configured to estimate a candidate maximum Doppler frequency for each of the delayed received signals to form a plurality of candidate maximum Doppler frequencies; and
a selector configured to select a maximum Doppler frequency in a reliable period from the candidate maximum Doppler frequencies, wherein the reliable period is based on a length of delay of the received signal and a speed range associated with the maximum Doppler frequency.

18. The base station of claim 17, wherein the estimation of the candidate maximum Doppler frequency for each of the delayed received signals is determined by an autocorrelation function or a covariance function.

19. The base station of claim 18, wherein the candidate maximum Doppler frequency determined by the autocorrelation function is determined by the following equation:

$$\hat{f}_d^{ACF(D=l)} = \frac{1}{2\pi \cdot l \cdot T_S} J_0^{-1}\left(\frac{\gamma+1}{\gamma}\frac{\phi_l}{\phi_0} - \frac{\mathrm{sinc}(B_m T_S)}{\gamma}\right)$$

where $\hat{f}_d^{ACF(D=l)}$ denotes the maximum Doppler frequency based on autocorrelation, l denotes the number of samples, $T_S$ denotes a sampling period, $\gamma$ denotes a Signal-to-Noise Ratio (SNR), $B_m$ denotes a noise bandwidth, $\phi_l$ denotes the autocorrelation function value between the received signals spaced apart by the $l^{th}$ sampling, $J(\bullet)$ denotes a Bessel function, and $\mathrm{sinc}(\bullet)$ denotes a sinc function.

20. The base station of claim 18, wherein the candidate maximum Doppler frequency determined by the covariance function is determined by the following equation:

$$\hat{f}_d^{COV(D=l)} = \frac{1}{2\pi \cdot l \cdot T_S} J_0^{-1}\left(\frac{\gamma+1}{\gamma}\sqrt{1 - \frac{V_1}{2\mathrm{Var}(a^2(i))}} - \frac{\mathrm{sinc}(B_m T_S)}{\gamma}\right)$$

where $\hat{f}_d^{COIV(D=l)}$ denotes the maximum Doppler frequency based on covariance, l denotes the number of samples, $T_S$ denotes a sampling period, $\gamma$ denotes an SNR, $B_m$ denotes a noise bandwidth, a(i) denotes the envelope of a received signal, Var($\bullet$) denotes a variance function, $J(\bullet)$ denotes a Bessel function, and $\mathrm{sinc}(\bullet)$ denotes a sinc function.

21. The base station of claim 17, wherein the maximum Doppler frequency is estimated less sensitively at low speed as a sample interval increases.

22. The base station of claim 17, wherein the selector is further configured to calculate the velocity corresponding to the selected maximum Doppler frequency.

23. The base station of claim 17, wherein the selector is further configured to determine the maximum Doppler frequency by comparing M candidate maximum Doppler frequencies, determined through sample delays $(l_1, l_2, \ldots, L_m)$, with (M−1) threshold values $(Th_1, Th_2, \ldots, Th_{M-1})$ in a reliable period of the maximum Doppler frequencies measured with the corresponding delays, where $l_i < l_{i+1}$ and $Th_i > Th_{i+1}$.

24. The base station of claim 23, wherein the threshold value $(Th_i)$ and the delay value $(l_i)$ for the candidate maximum Doppler frequency are determined according to the system requirement and efficiency.

* * * * *